US011931613B2

(12) United States Patent
Johnson et al.

(10) Patent No.: US 11,931,613 B2
(45) Date of Patent: Mar. 19, 2024

(54) NOISE REDUCING FIRE SUPPRESSION NOZZLES

(71) Applicant: Carrier Corporation, Palm Beach Gardens, FL (US)

(72) Inventors: Paul M. Johnson, Clinton, MA (US); Duane C. McCormick, Colchester, CT (US); May L. Corn, Manchester, CT (US); Sudarshan N. Koushik, West Hartford, CT (US); Mikhail Morozov, Ashland, MA (US); Changmin Cao, Pudong (CN); Christopher T. Chipman, Killingly, CT (US); Keith A. Post, Colchester, CT (US)

(73) Assignee: Carrier Corporation, Palm Beach Gardens, FL (US)

(*) Notice: Subject to any disclaimer, the term of this patent is extended or adjusted under 35 U.S.C. 154(b) by 72 days.

(21) Appl. No.: 17/403,772

(22) Filed: Aug. 16, 2021

(65) Prior Publication Data

US 2021/0370112 A1 Dec. 2, 2021

Related U.S. Application Data

(62) Division of application No. 16/182,247, filed on Nov. 6, 2018, now Pat. No. 11,117,007.

(Continued)

(51) Int. Cl.

*A62C 31/05* (2006.01)
*A62C 5/00* (2006.01)

(Continued)

(52) U.S. Cl.

CPC .............. *A62C 31/05* (2013.01); *A62C 5/008* (2013.01); *A62C 31/02* (2013.01); *B05B 1/002* (2018.08)

(58) Field of Classification Search

CPC ......... A62C 31/05; A62C 5/008; A62C 31/02; B05B 1/002

See application file for complete search history.

(56) References Cited

U.S. PATENT DOCUMENTS 2,046,592 A * 7/1936 Tracy ........................ B05B 7/10 239/405
2,259,011 A * 10/1941 Taylor ........................ B05B 7/12 239/419

(Continued)

FOREIGN PATENT DOCUMENTS

CN 104159642 A 11/2014
CN 105781791 A 7/2016

(Continued)

OTHER PUBLICATIONS

T.G. Tillman et al., "Supersonic Nozzle Mixer Ejector", Journal of Propulsion and Power, vol. 8, No. 2, Mar.-Apr. 1992, pp. 513.

(Continued)

*Primary Examiner* — Joseph A Greenlund
(74) *Attorney, Agent, or Firm* — Locke Lord LLP; Gabrielle L. Gelozin; Daniel J. Fiorello

(57) ABSTRACT

A fire suppression nozzle can include a first fluid channel configured to be in fluid communication with a first fluid having a first flow velocity and a second fluid channel configured to be in fluid communication with a second fluid having a second flow velocity. A mixer can be disposed between the first fluid channel and the second fluid channel such that the mixer is configured to induce streamwise vorticity in at least the first fluid exiting first fluid channel to cause mixing of the first fluid and the second fluid to reduce a flow speed of a mixture of the first fluid and the second fluid.

10 Claims, 12 Drawing Sheets

Related U.S. Application Data

(60) Provisional application No. 62/584,620, filed on Nov. 10, 2017.

(51) Int. Cl.
*A62C 31/02* (2006.01)
*B05B 1/00* (2006.01)

(56) References Cited

U.S. PATENT DOCUMENTS

| | | | | | |
|---|---|---|---|---|---|
| 3,790,086 | A * | 2/1974 | Masai | B05B 7/10 | 239/406 |
| 4,335,801 | A * | 6/1982 | Stachowiak | F02K 1/48 | 181/220 |
| 4,645,129 | A * | 2/1987 | Terrade | B05B 7/0892 | 239/430 |
| 4,655,395 | A * | 4/1987 | Cioffi | B05B 7/0416 | 239/432 |
| 5,014,790 | A * | 5/1991 | Papavergos | A62C 5/024 | 169/44 |
| 5,495,893 | A * | 3/1996 | Roberts | B05B 7/0012 | 137/896 |
| 5,553,785 | A * | 9/1996 | Haruch | B05B 1/3436 | 239/432 |
| 5,598,700 | A * | 2/1997 | Varshay | B63H 11/103 | 60/221 |
| 5,810,252 | A * | 9/1998 | Pennamen | B05B 7/0892 | 239/427.3 |
| 5,868,321 | A * | 2/1999 | Haruch | B05B 7/0466 | 239/432 |
| 6,098,897 | A * | 8/2000 | Lockwood | B05B 7/0441 | 239/432 |
| 6,557,785 | B1 * | 5/2003 | Knapp | B05B 1/265 | 239/311 |
| 7,721,811 | B2 * | 5/2010 | Reilly | A62C 99/0072 | 169/37 |
| 7,753,167 | B2 * | 7/2010 | Fukano | F15B 21/008 | 181/158 |
| 8,789,769 | B2 * | 7/2014 | Fenton | A62C 99/0072 | 239/431 |
| 8,887,820 | B2 * | 11/2014 | Hill | A62C 3/16 | 169/11 |
| 8,915,307 | B2 * | 12/2014 | Lelic | A62C 31/05 | 239/222.11 |
| 8,991,727 | B2 * | 3/2015 | Worthy | B01F 23/2132 | 239/398 |
| 9,089,724 | B2 * | 7/2015 | Fenton | B05B 1/262 | |
| 9,457,214 | B2 * | 10/2016 | Goto | A62C 31/02 | |
| 9,616,432 | B2 * | 4/2017 | Hayata | B05B 7/0425 | |
| 9,616,433 | B2 * | 4/2017 | Hayata | B05B 1/083 | |
| 9,999,893 | B2 * | 6/2018 | Fenton | B05B 7/0853 | |
| 10,434,526 | B2 * | 10/2019 | Fenton | B05B 7/0483 | |
| 10,583,445 | B2 * | 3/2020 | Rogers | B05B 1/265 | |
| 11,117,007 | B2 * | 9/2021 | Johnson | B05B 1/002 | |
| 2004/0188104 | A1 * | 9/2004 | Borisov | B05B 7/0807 | 169/62 |
| 2004/0222317 | A1 * | 11/2004 | Huffman | B05B 7/0475 | 239/398 |
| 2009/0314500 | A1 * | 12/2009 | Fenton | B05B 7/0466 | 239/543 |
| 2010/0301129 | A1 * | 12/2010 | Fenton | A62C 5/008 | 239/10 |
| 2011/0127347 | A1 * | 6/2011 | Worthy | B01F 25/12 | 239/8 |
| 2011/0203813 | A1 * | 8/2011 | Fenton | A62C 99/0072 | 239/419 |
| 2012/0018531 | A1 * | 1/2012 | Fenton | A62C 31/05 | 239/11 |
| 2014/0352698 | A1 * | 12/2014 | Kim | B01F 25/31233 | 239/289 |
| 2015/0048176 | A1 * | 2/2015 | Jones | B05B 7/0433 | 239/8 |
| 2016/0030899 | A1 * | 2/2016 | Worthy | B01F 25/12 | 239/398 |
| 2016/0038954 | A1 * | 2/2016 | Fenton | A62C 31/05 | 239/589 |
| 2017/0304851 | A1 * | 10/2017 | Paal | B05B 7/0892 | |
| 2018/0272166 | A1 * | 9/2018 | Ahmadzadegan | F15B 21/008 | |
| 2018/0272167 | A1 * | 9/2018 | Ahmadzadegan | A62C 31/05 | |
| 2019/0111444 | A1 * | 4/2019 | Rogers | A62C 5/008 | |
| 2019/0143160 | A1 * | 5/2019 | Johnson | A62C 5/008 | 169/37 |
| 2022/0355143 | A1 * | 11/2022 | Koushik | A62C 31/05 | |
| 2022/0362596 | A1 * | 11/2022 | Wolf | A62C 27/00 | |

FOREIGN PATENT DOCUMENTS

| | | | |
|---|---|---|---|
| EP | 1151800 | A2 | 11/2001 |
| EP | 3195905 | A1 | 7/2017 |
| JP | 4561349 | B2 | 10/2010 |
| JP | 2015091305 | A | 5/2015 |
| WO | 12136468 | A2 | 10/2012 |
| WO | 17096261 | A1 | 6/2017 |

OTHER PUBLICATIONS

2018 Johnson Controls, "Ansul® Acoustic Nozzle" Data Sheet, Form No. F-2016267-01, 2 pages.

Extended European Search Report issued by the European Patent Office, dated Apr. 10, 2019.

Office Action issued in corresponding Chinese application No. 201811331469.8, dated Nov. 2, 2020.

* cited by examiner

NOISE REDUCING FIRE SUPPRESSION NOZZLES

CROSS-REFERENCE TO RELATED APPLICATION

This application is a divisional of U.S. patent application Ser. No. 16/182,247, filed Nov. 6, 2018, which claims the benefit of priority under 35 U.S.C. § 119(e) to U.S. Provisional Application No. 62/584,620, filed Nov. 10, 2017, which is incorporated herein by reference in its entirety.

BACKGROUND

1. Field

The present disclosure relates to fire suppression systems, more specifically to fire suppression nozzles.

2. Description of Related Art

In the Fire Protection market, there exists a high value sub-market for data-centers. These areas are extremely valuable, and require protection from fire. Data centers have been recently found to be extremely sensitive to excessive noise, and traditional fire suppression systems produce above a desired threshold of noise which can potentially damage data center equipment. Currently available silencers greatly reduce nozzle performance but still cannot reduce the noise below 100-110 db without significantly reducing the coverage area.

While turbomachines have utilized noise reduction systems for high speed flow, no such systems exist for fire suppression. Such conventional methods and systems have generally been considered satisfactory for their intended purpose. For areas where fire suppression is required for safety that have a high degree of noise sensitivity, e.g., such as in data centers and other noise-sensitive applications, there is still a need for further reduction of noise with low loss of performance with respect to fire suppression.

SUMMARY

A fire suppression nozzle can include a first fluid channel configured to be in fluid communication with a first fluid having a first flow velocity and a second fluid channel configured to be in fluid communication with a second fluid having a second flow velocity. A mixer can be disposed between the first fluid channel and the second fluid channel such that the mixer is configured to induce streamwise vorticity in at least the first fluid exiting first fluid channel to cause mixing of the first fluid and the second fluid to reduce a flow speed of a mixture of the first fluid and the second fluid.

In certain embodiments, the first fluid channel can be defined by a nozzle body. The mixer can be defined by the nozzle body or attached to the nozzle body. In certain embodiments, the mixer can include angled holes configured to effuse the first fluid from the first fluid channel into the second fluid channel. The angled holes can be angled relative to each other to cause vorticity in first fluid as it exits the first fluid channel, for example.

The second fluid channel can be defined at least partially by an upper shroud disposed around the nozzle body. For example, the second fluid channel can be defined at least partially between the upper shroud and the nozzle body.

The upper shroud can be attached to the nozzle body by one or more ribs. In certain embodiments, the second fluid is air and the upper shroud is open to the atmosphere to allow air to be drawn in by flow entrainment from the first fluid effusing from the first fluid channel to mix air with the fluid.

The second fluid channel can be defined at least partially by a lower shroud attached to or integral with the nozzle body and/or the mixer downstream of the mixer. The lower shroud and the upper shroud can define an outlet of the second fluid channel therebetween where mixed first and second fluid effuse to the atmosphere. In certain embodiments, the outlet can include a constant flow area or an expanding flow area, for example.

In certain embodiments, the mixer can be defined by a lobe mixing shape to cause both the first fluid and the second fluid to rotate together. The mixer can be vertically oriented such that the first fluid effuses toward the lower shroud and lobe mixes with the second fluid as it exits the first fluid channel. In certain embodiments, the mixer can be horizontally oriented such that the first fluid effuses toward the outlet and lobe mixes with the second fluid as it exits the first fluid channel. Any suitable combination of both is contemplated herein.

In accordance with at least one aspect of this disclosure, a nozzle body for a fire suppression nozzle can include a first fluid channel configured to be connected to a first fluid source for fire suppression, and a mixer as described herein defined by or attached to the first fluid channel. As disclosed herein, the mixer can be configured to induce streamwise vorticity in at least the first fluid as it exits the first fluid channel to cause mixing of the first fluid and a second fluid to reduce a flow speed of a mixture of the first fluid and the second fluid.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

The present disclosure provides a solution for the need for fire suppression in applications with high noise sensitivity that require noise reduction with low or no loss of performance in fire suppression, and, in some cases possibly improving the performance.

Figure 1:
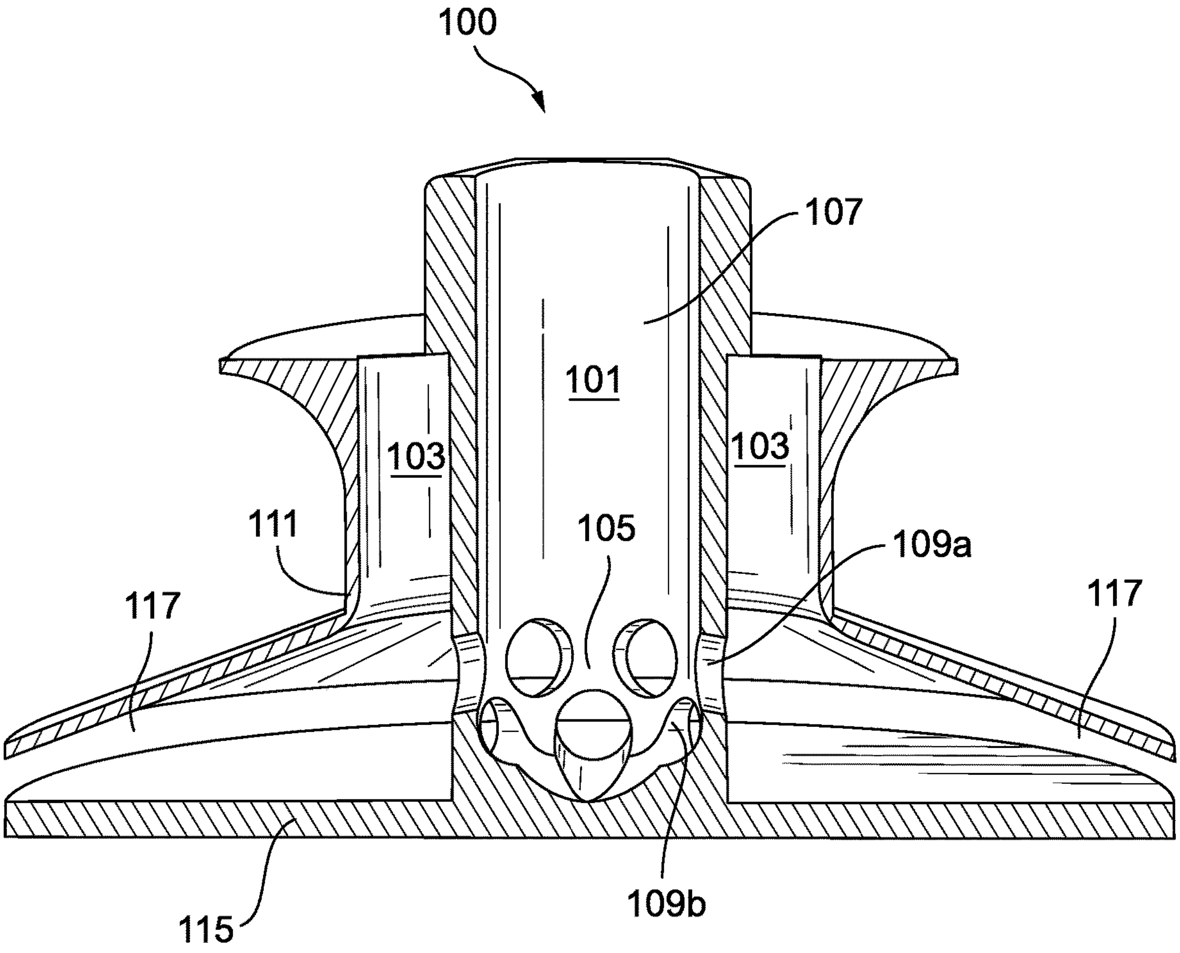
FIG. 1 is a perspective cross-sectional view of an embodiment of a fire suppression nozzle in accordance with this disclosure.

Reference will now be made to the drawings wherein like reference numerals identify similar structural features or aspects of the subject disclosure. For purposes of explanation and illustration, and not limitation, an illustrative view of an embodiment of a nozzle in accordance with the disclosure is shown in FIG. 1 and is designated generally by reference character 100. Other embodiments and/or aspects of this disclosure are shown in FIGS. 2A-6B. The systems and methods described herein can be used to reduce noise in fire suppression systems, and/or for any other suitable use.

Referring to FIG. 1, a fire suppression nozzle 100 can include a first fluid channel 101 configured to be in fluid communication with a first fluid (e.g., any suitable fire suppression fluid for data centers) having a first flow velocity. The first fluid can be an inert gas agent, or any other suitable fluid for use in fire suppression.

A second fluid channel 103 is configured to be in fluid communication with a second fluid (e.g., air in the atmosphere) having a second flow velocity. A mixer 105 can be disposed between the first fluid channel 101 and the second fluid channel 103. The mixer 105 is configured to induce streamwise vorticity in at least the first fluid exiting first fluid channel 101 to cause efficient mixing of the first fluid and the second fluid to reduce a flow speed of a mixture of the first fluid and the second fluid.

In certain embodiments, the first fluid channel 101 can be defined by a nozzle body 107. As shown, the mixer 105 can be defined by the nozzle body 107. However, in certain embodiments, the mixer 105 can be a separate component attached to the nozzle body 107 in any suitable manner.

In certain embodiments, the mixer 105 can include a plurality of angled holes 109*a*, 109*b* configured to effuse the first fluid from the first fluid channel 101 into the second fluid channel 103. The angled holes 109*a*, 109*b* can be angled relative to each other to cause vorticity in first fluid as it exits the first fluid channel 101 through the mixer 105, for example.

As shown, the angled holes 109*a*, 109*b* can include a first upstream row of circumferentially spaced angled holes 109*a*. The first row of angled holes 109*a* can be angled in a first direction (e.g., downward as shown). The angled holes 109*a*, 109*b* can also include a second, more downstream, row of angled holes 109*b*. As shown, the second row of angled holed 109*b* can be angled in a second direction (e.g., upward or sideways) that is different than the direction of the first row of angled holes. Any other suitable configuration and/or number of angled holes 109*a*, 109*b* is contemplated herein.

The second fluid channel 103 can be defined at least partially by an upper shroud 111 disposed around the nozzle body 107. For example, as shown, the second fluid channel 103 can be defined at least partially between the upper shroud 111 and the nozzle body 107. The upper shroud 111 can include any suitable shape as appreciated by those having ordinary skill in the art.

FIGS. 2A-2H show another embodiment of a fire suppression nozzle 200. Referring additionally to FIGS. 2A-2H, the upper shroud 111 can be attached to the nozzle body 107 by one or more ribs 113. While eight ribs 113 are shown, any suitable number of ribs is contemplated herein (e.g., one, four).

The one or more ribs 113 can allow the second fluid channel 103 to be open to the atmosphere. Therefore, in certain embodiments, the second fluid can be air and air can be drawn in by flow entrainment effect from the first fluid effusing from the first fluid channel 101 to mix air with the first fluid. Any other suitable attachment type is contemplated herein. In certain embodiments, additionally or alternatively, the upper shroud 111 can be attached to a lower shroud 115, 215 by one or more downstream struts (e.g., similar to ribs 113 that directly connect the upper shroud 111 to the lower shroud 115, 215).

Figure 2A:
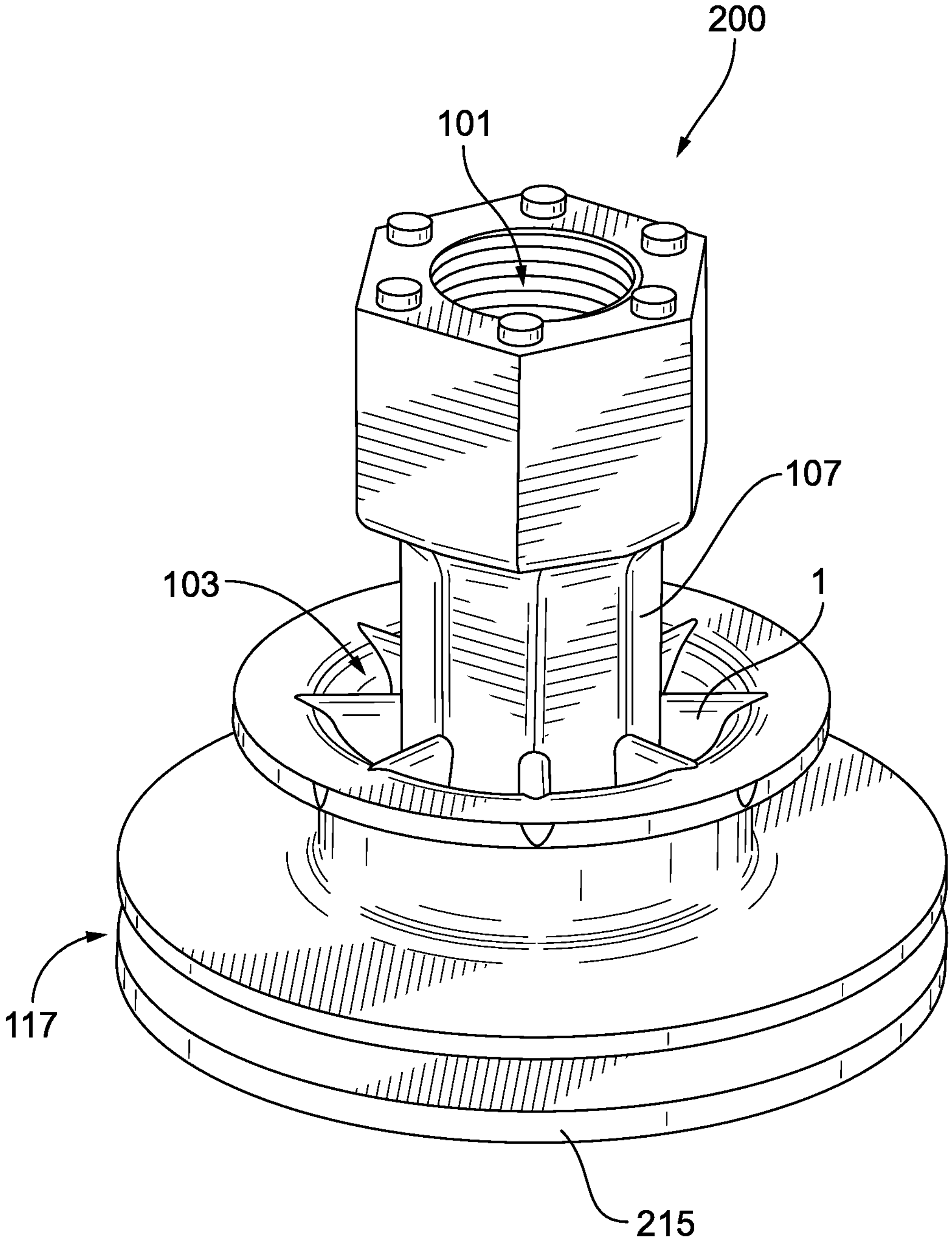
FIG. 2A is a perspective view of another embodiment of a fire suppression nozzle in accordance with this disclosure.
Figure 2B:
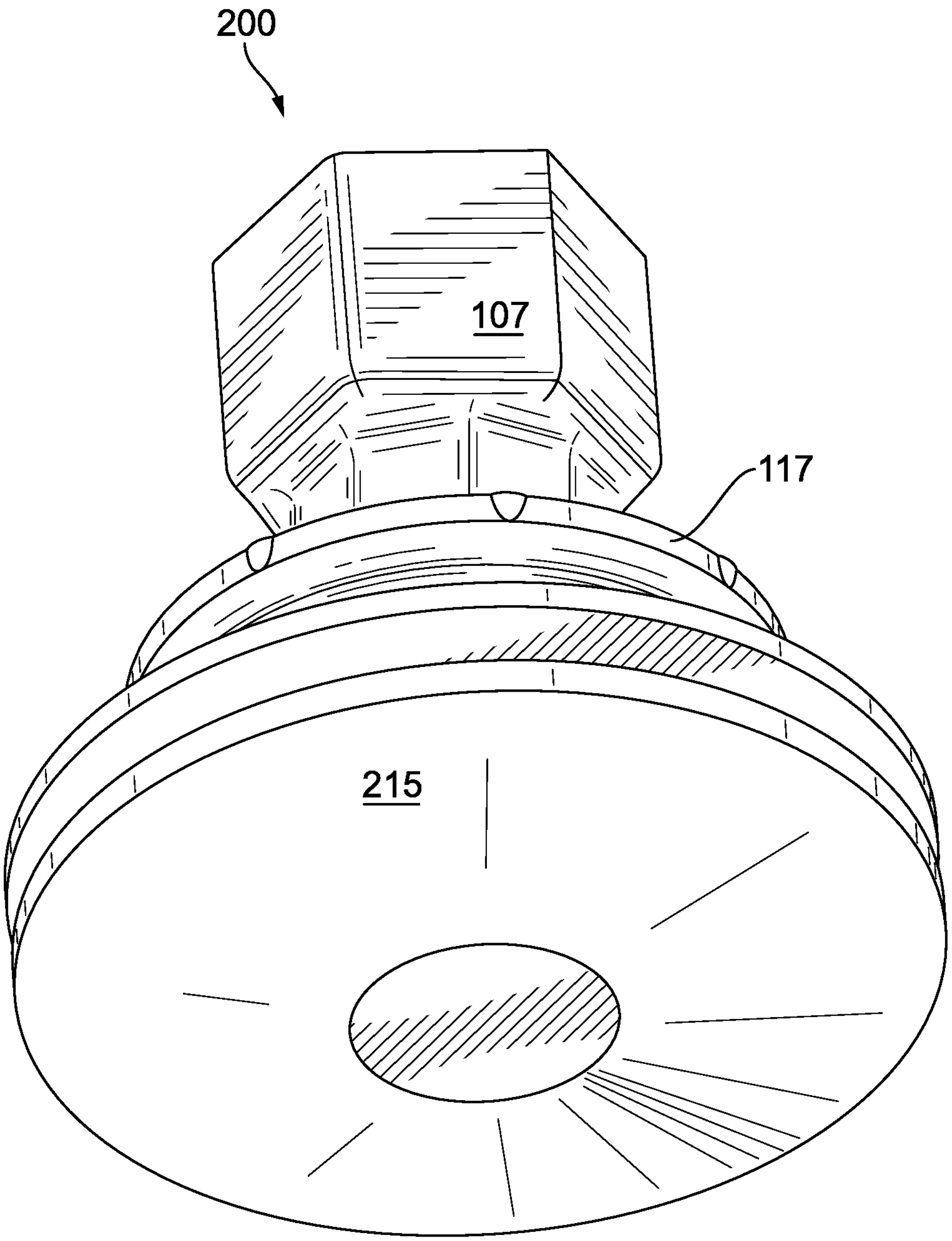
FIG. 2B is a perspective view of the embodiment of FIG. 2A, shown from an underside perspective.
Figure 2C:
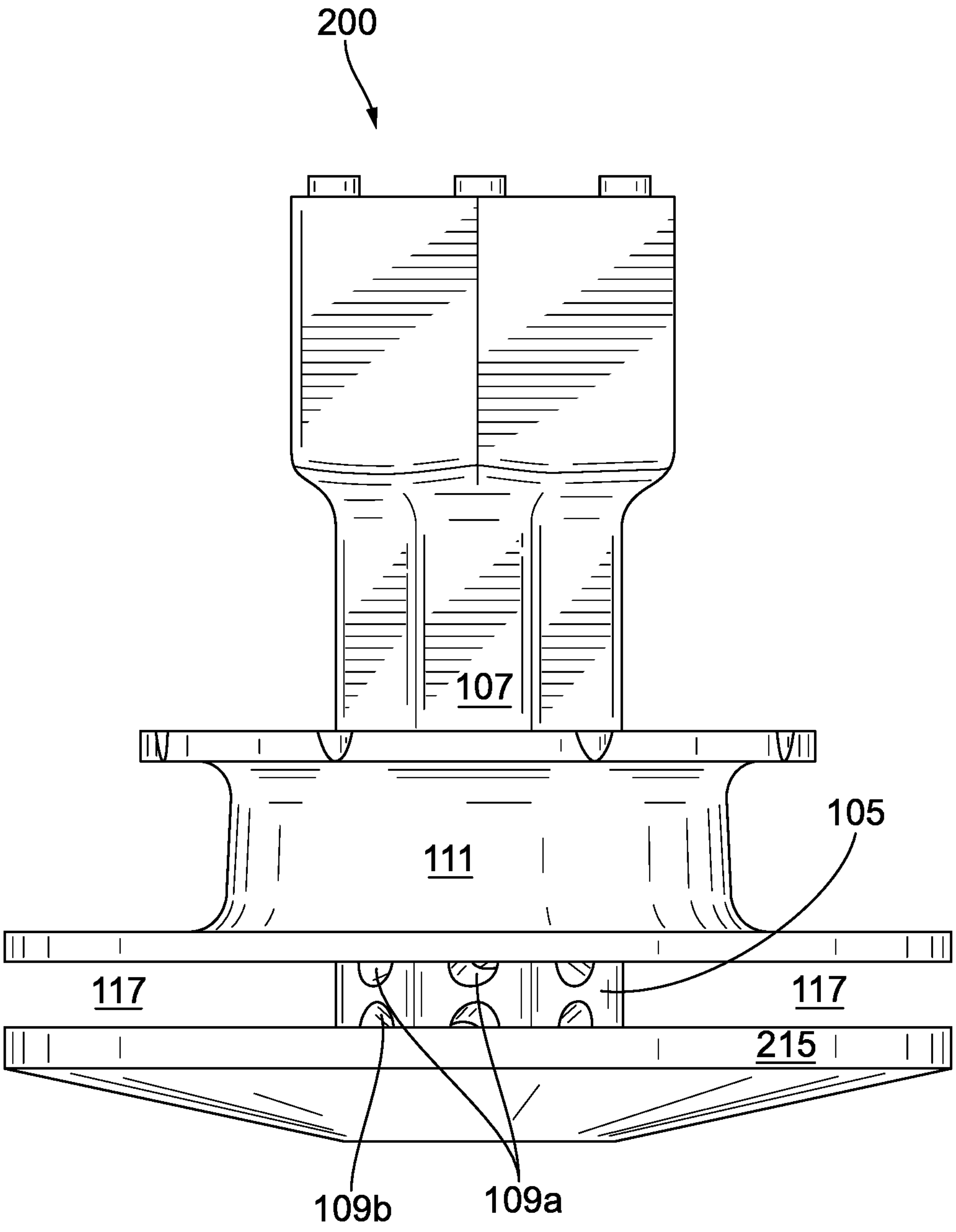
FIG. 2C is an elevation view of the embodiment of FIG. 2A.
Figure 2D:
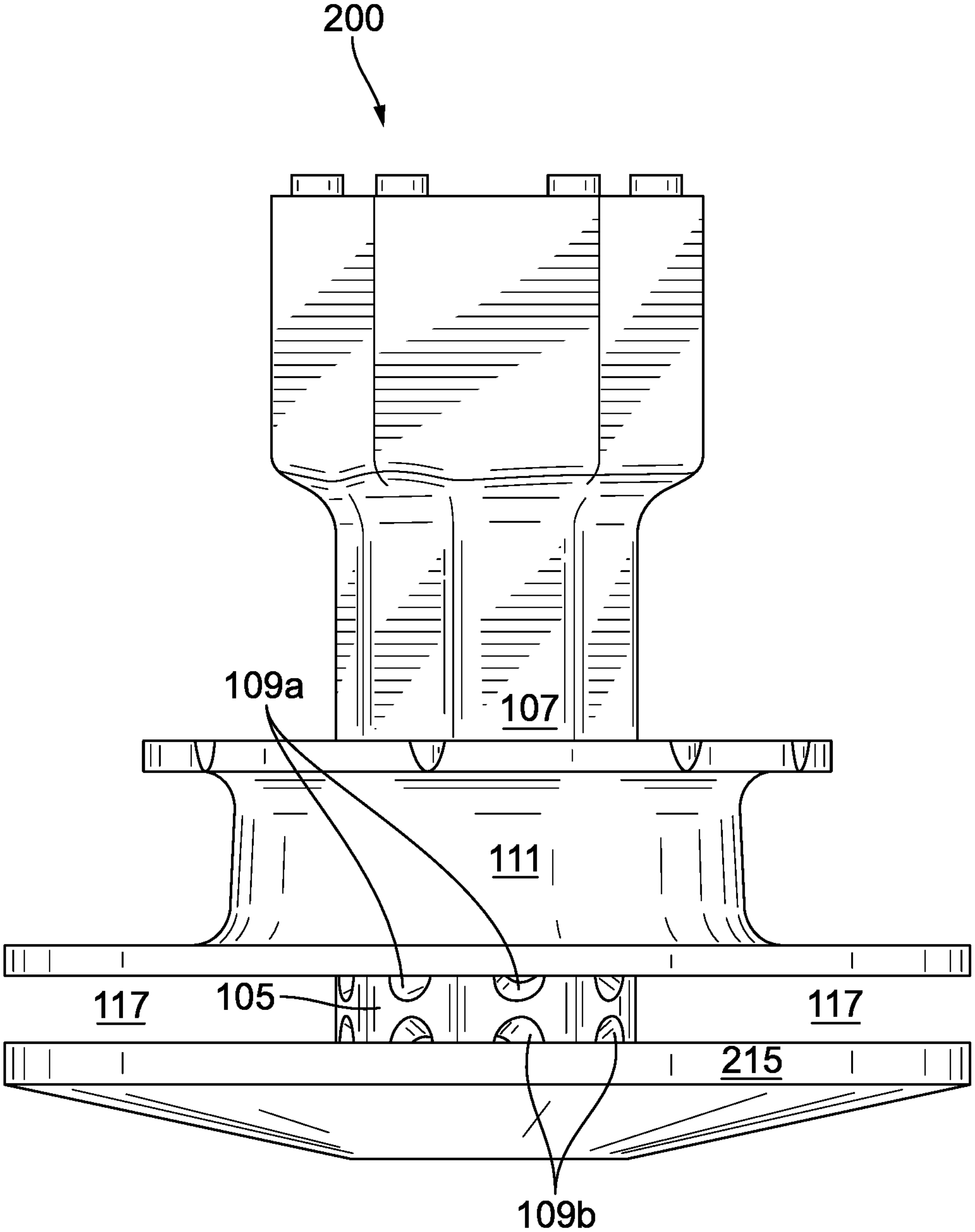
FIG. 2D is an elevation view of the embodiment of FIG. 2A, shown without external protrusions on the upper shroud.
Figure 2E:
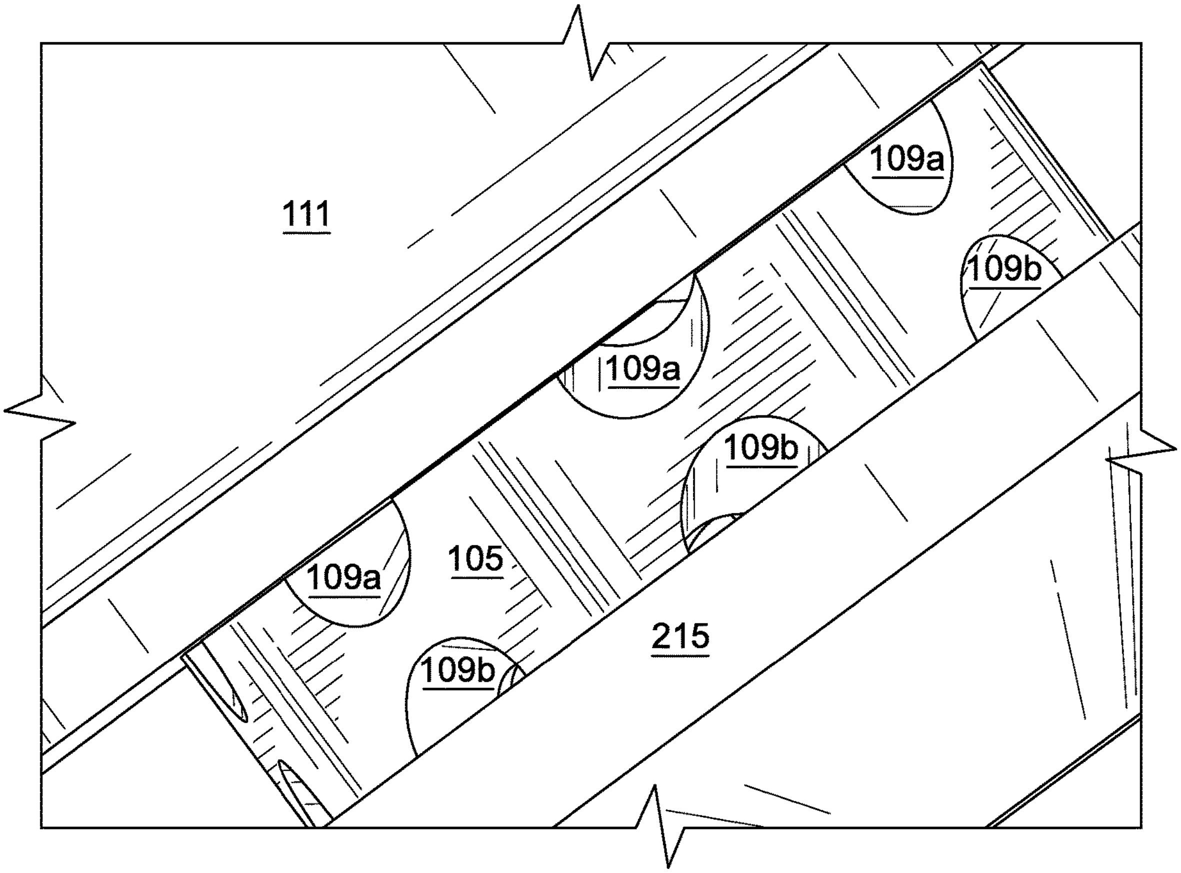
FIG. 2E is a perspective zoomed view of a portion of the embodiment of FIG. 2A, showing angled holes at different angles in the nozzle body.
Figure 2F:
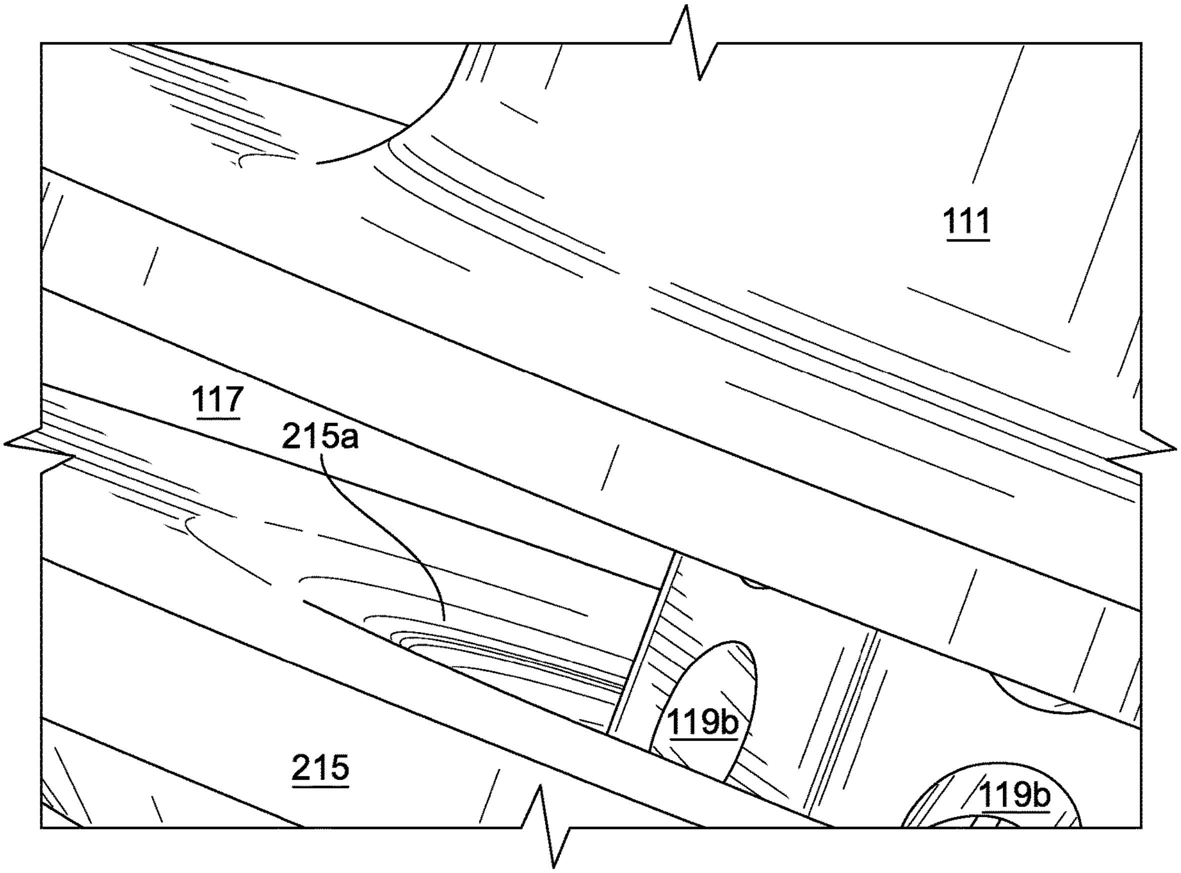
FIG. 2F is a perspective zoomed view of a portion of the embodiment of FIG. 2A, showing a curvature in the lower shroud where the nozzle body meets the lower shroud in a recessed configuration.
Figure 2G:
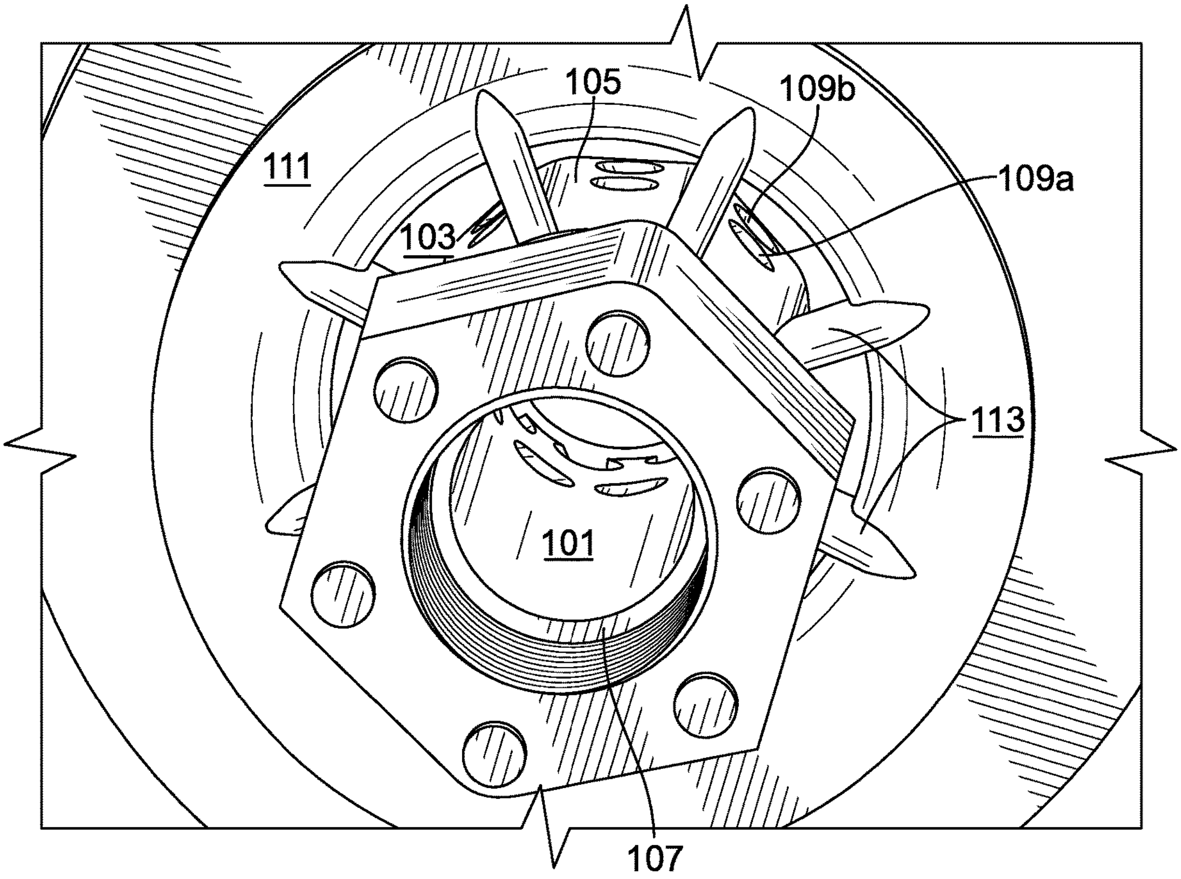
FIG. 2G is a perspective zoomed view of a portion of the embodiment of FIG. 2A, showing the first fluid channel defined, the second fluid channel, and the mixer.
Figure 2H:
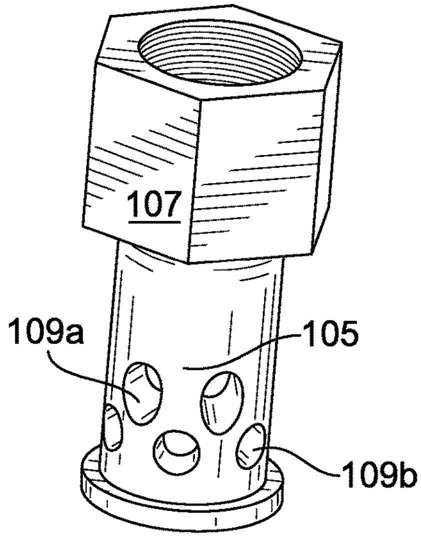
FIG. 2H is a perspective zoomed view of the nozzle body of the embodiment of FIG. 2A, shown isolated from the nozzle.

Referring to FIGS. 1-2H, the second fluid channel 103 can be defined at least partially by the lower shroud 115, 215 attached to or integral with the nozzle body 107 and/or the mixer 105 downstream of the mixer 105. The lower shroud 115, 215 and the upper shroud can define an outlet 117 of the second fluid channel 103 therebetween where mixed first and second fluid effuse to the atmosphere (e.g., for suppressing a fire). In certain embodiments, at least a portion of the outlet 117 can include a constant flow mixing area and/or an expanding flow area, for example. For example, the entire outlet 117 can be constant in flow area. The outlet 117 can include a diffuser downstream of a constant flow mixing area. Any suitable outlet shape, e.g., with a constant or changing flow area is contemplated herein. As appreciated by those having ordinary skill in the art in view of this disclosure, the benefit of expanding the flow area after a constant flow mixing area, is to diffuse the mixed flows which lowers the pressure at the secondary fluid inlet which in turns increased the secondary flow rate and, hence, the benefits of the ejector (reduced noise and increase thrust/area coverage).

As shown in FIG. 2F, the lower shroud 215 can be shaped to have a recess 215*a*. The recess 215*a* can include a curvature as shown, or any other suitable shape. The mixer 105 can connect to or extend from the lower shroud 215 at the recess 215*a*. Any other suitable shape (e.g., flat as shown in FIG. 1) is contemplated herein for the lower shroud 115, 215.

Figure 3:
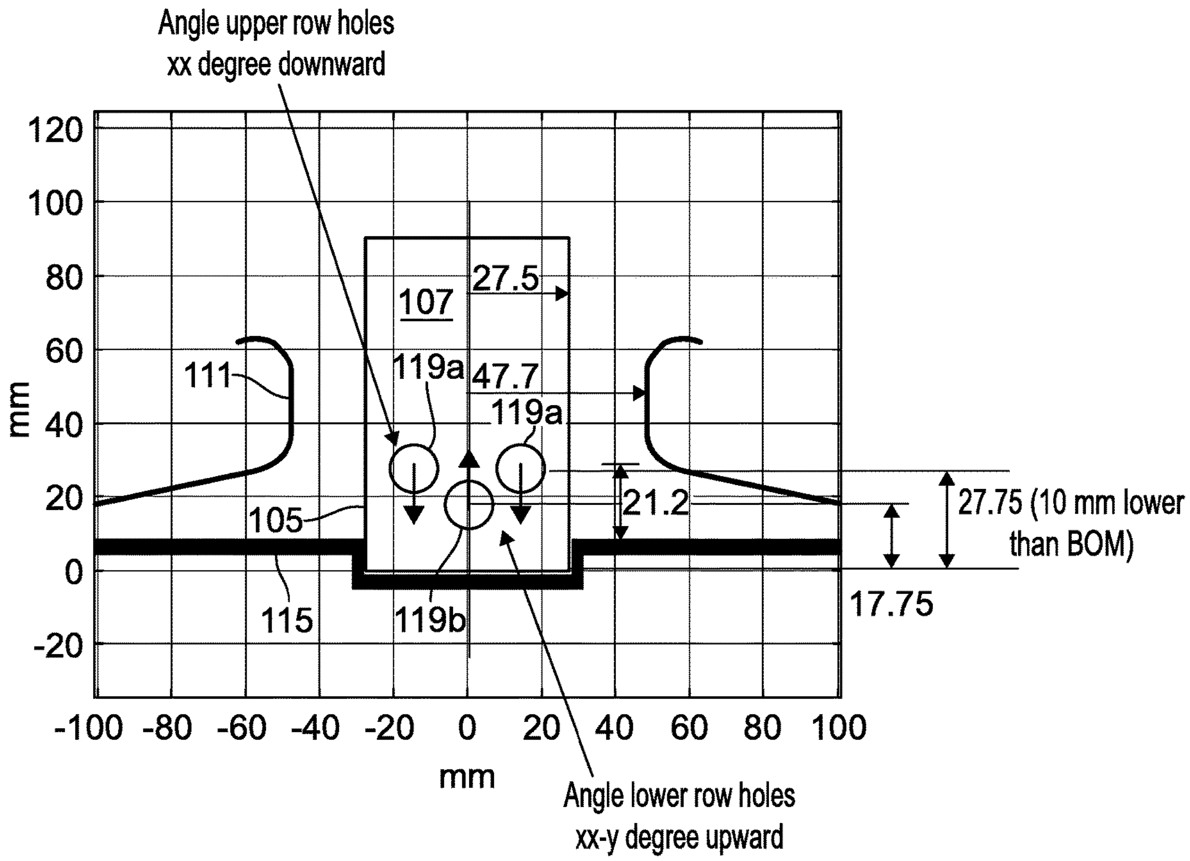
FIG. 3 shows a schematic representation of an embodiment, showing flow effusing from the angled holes at different angles.

Referring to FIG. 3, a schematic 2-dimensional diagram of effusing flow for an example embodiment of a fire suppression nozzle is shown. For example, the angled holes 119*a* can allow the first fluid to exit the mixer 105 downward toward the lower shroud 115 (or 215, not shown) and the angled holes 119*b* can effuse fluid upward. In certain embodiments, the angled holes 119*b* can effuse fluid in an opposite direction from angled holes 119*a* such that a vertical vector of flow (e.g., along the nozzle body 107) of angled holes 119*a*, 119*b* are opposite (one goes up and the other down). In certain embodiments, flow effusing from the angled holes 119*a* can be angled toward the lower shroud 115 (e.g., at about 45 degrees) and the angled holes 119*b* can be angled toward the upper shroud 111 (e.g., at about 45 degrees), however, any angle for flow effusing that allows vorticity is contemplated herein. While specific dimensions are shown in FIG. 3, any suitable dimensions, relative or otherwise, are contemplated herein.

In certain embodiments, the range of cross-stream flow angles that can induce efficient mixing can be from about 15 to about 45 degrees. The physical metal angle of the holes may differ from the actual flow angles due to interactions with the upstream flow direction in the first fluid channel, for example. As appreciated by those having ordinary skill in the art in view of this disclosure, an optimal flow angle can be considered a trade between rapid mixing (e.g., highest angles cause the greatest mixing) and reduction in streamwise momentum (e.g., highest angles suffer the greatest loss in streamwise momentum). Accordingly, in certain embodiments, the angled holes 119*a*, 119*b* can include suitable hole angle to cause a relative flow direction between about 15 degrees and 45 degrees, or any other suitable range of angles.

Figure 4:
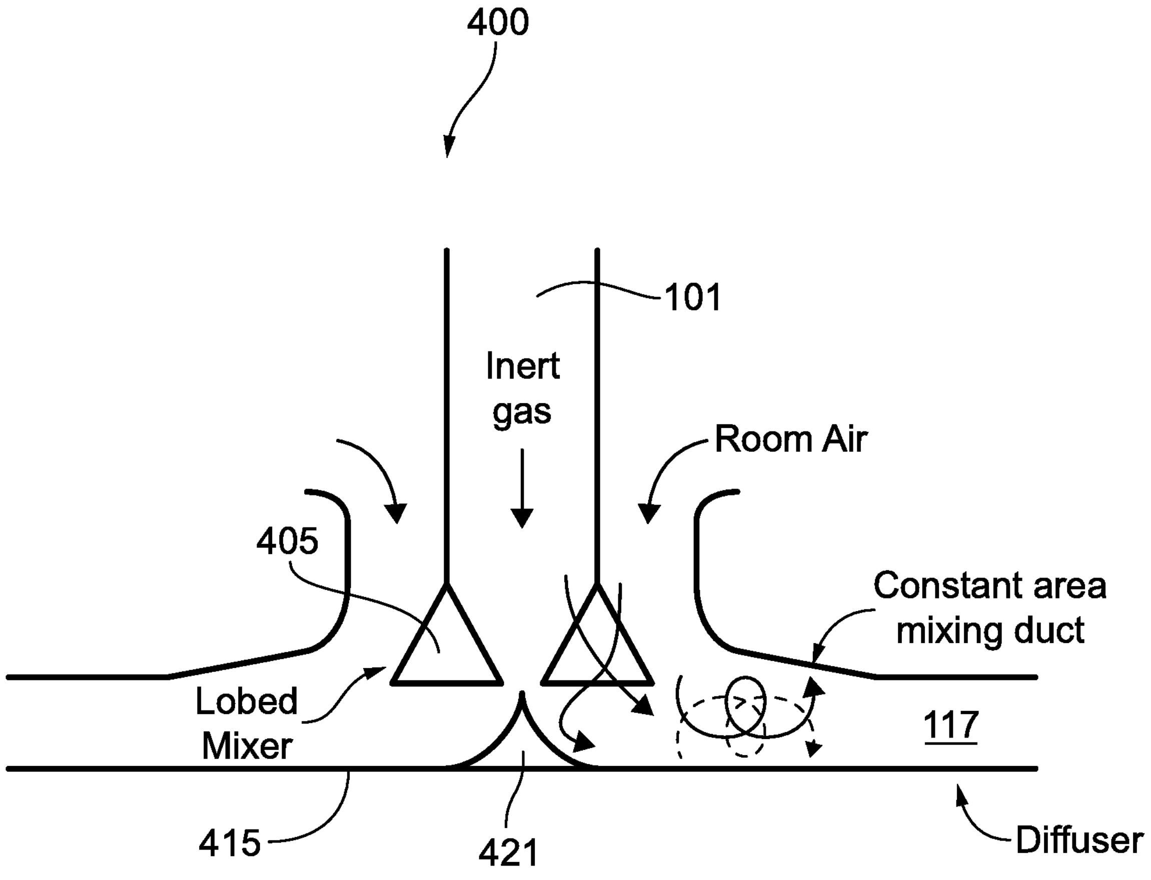
FIG. 4 is a schematic of an embodiment of a fire suppression nozzle in accordance with this disclosure, showing a vertically oriented lobe mixer.
Figure 5:
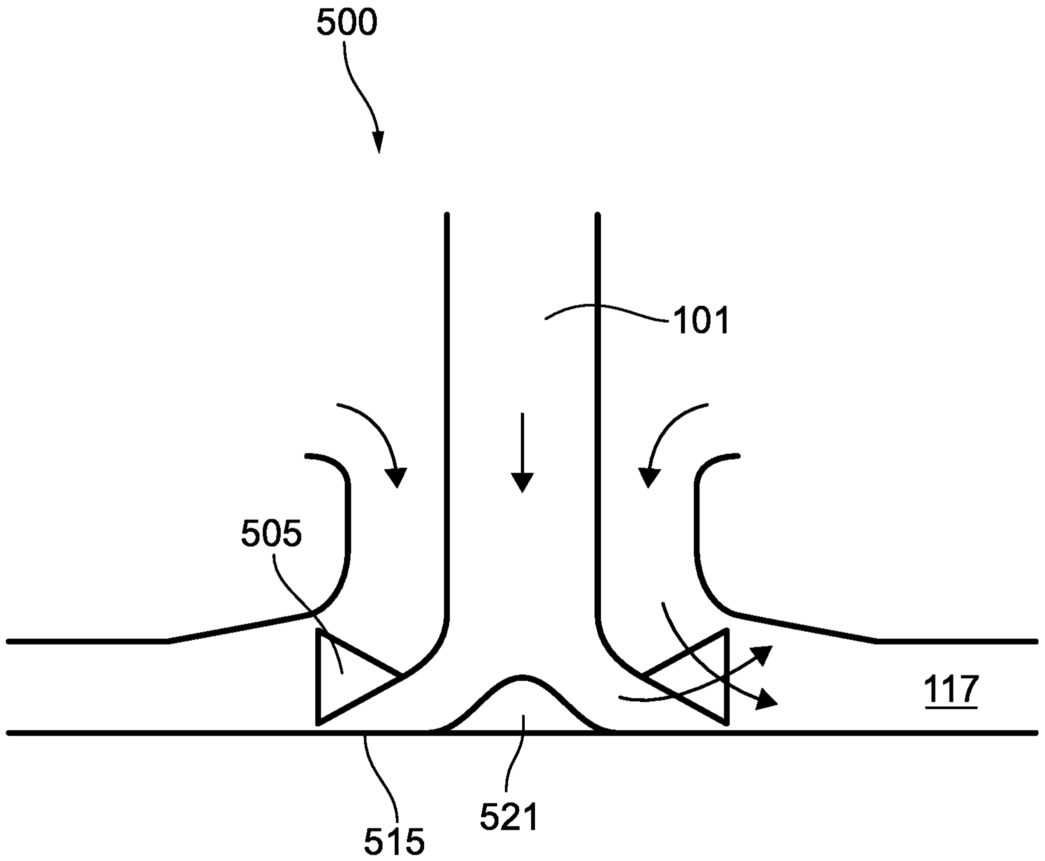
FIG. 5 is a schematic of an embodiment of a fire suppression nozzle in accordance with this disclosure, showing a horizontally oriented lobe mixer.

Referring to FIGS. 4 and 5, in certain embodiments of fire suppression nozzle 400, 500, the mixer 405, 505 can be defined by a lobe mixing shape to cause both the first fluid and the second fluid to rotate together. One having ordinary skill in the art appreciates what a lobe mixing shape is. For example, an undulating shape at an outlet can be used for lobe mixing. An example of a lobe mixing structure can be found in U.S. Pat. No. 4,335,801, incorporated by reference herein. Any suitable lobe mixing shape for causing vorticity in the first and second fluid is contemplated herein.

Referring to FIG. 4, the mixer 405 can be vertically oriented such that the first fluid effuses toward the lower shroud 415 and mixes, via lobe mixing, with the second fluid as it exits the first fluid channel 101 through the mixer 405. The shape of the vertically oriented mixer 405 can be similar to a turbomachine lobe mixer as appreciated by those having ordinary skill in the art. The lower shroud 415 can include a peak (e.g., a pointed curved cone shape) 421 disposed at the exit of the mixer 405 to aid in guiding mixing flow with vorticity outward to the outlet 117.

Referring to FIG. 5, in certain embodiments, the mixer 505 can be horizontally oriented such that the first fluid effuses toward the outlet 117 and mixes, via lobe mixing, with the second fluid as it exits the first fluid channel 101 through the mixer 505. The horizontally oriented mixer 505 can include any suitable shape as appreciated by those skilled in the art (e.g., a neck ruffle shape). The lower shroud 515 can include a peak (e.g., a rounded curved cone shape) 521 disposed upstream of the exit of the mixer 505 to divide the first fluid and guide it toward the mixer 505.

Figure 6A:
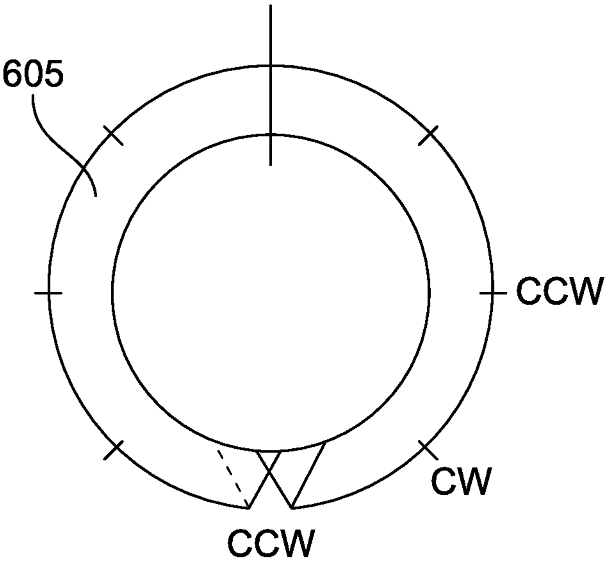
FIGS. 6A and 6B are schematic diagrams of an embodiment of hole pairs positioned circumferentially on the nozzle and configured to produced clockwise (CW) and/or counter clockwise (CCW) flow.

FIG. 6A is schematic diagram of an embodiment of hole pairs positioned circumferentially on a nozzle 605 and configured to produce clockwise (CW) and/or counter clockwise (CCW) flow. In certain embodiments, as shown in FIG. 6A, the hole angles of the hole pairs can be alternated circumferentially to produce alternating vorticity (CCW-CW-CCW-CW-etc.) around the circumference of the nozzle. In certain embodiments, co-rotating vorticity patterns (CCW-CCW- . . . ) can be utilized, for example. Any suitable pattern that causes desired mixing and vorticity is contemplated herein.

Figure 6B:
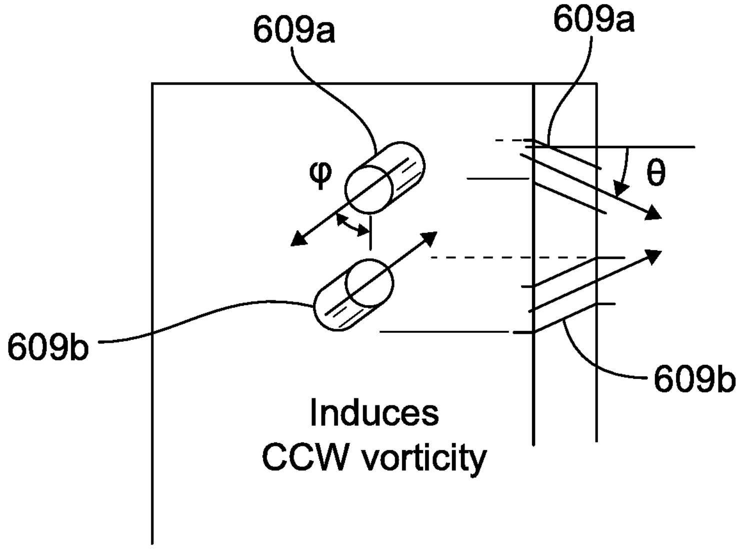

In certain embodiments, referring additionally to FIG. 6B, hole pairs that generate a vortex can be placed at the same clock position on the circumference of the nozzle 605, such that one is on top of the other. For example, the holes 109*a*, 109*b* as shown in FIGS. 2G, 2H, and 3 show circumferentially spaced rows of holes instead of holes that are at the same clock position, whereas the embodiment of hole position in FIGS. 2C-2F, and 6B shows on hole 609*a* on top of hole 609*b*. FIG. 6B also schematically shows a cross-sectional side view of holes 609*a*, 609*b* on the right side of FIG. 6B shown aligned with the plan view on the left side of FIG. 6B.

As further shown in FIG. 6B the holes 609*a*, 609*b* can be described as angled relative to each other in two dimensions, φ and θ. In certain embodiments, as shown, φ can be described as the angle of flow effusing in the plane of the opening of each hole 609*a*, 609*b*, for example. In the certain embodiments, θ can be described as the angle relative to the upper shroud 111 and/or the angle relative to the lower shroud 115, 215, and/or the angle relative to the normal vector to the surface of the nozzle body 107. In certain embodiments, the angle φ for each hole can be about 180 degrees opposite so that flow effuses in an opposite direction (e.g., such that hole 609*a* has φ=45 degrees and hole 609*b* has φ=225 degrees from the line shown). In certain embodiments, the angle θ each hole can be selected to be converging (e.g., such that hole 609*a* has θ=45 down from the horizontal and hole 609*b* has θ=45 degree up from the horizontal as shown). Any other suitable hole placement, position, effusing direction, and/or pattern, relative to one or more other holes that is configured to induce a desired vorticity and/or mixing is contemplated herein.

In certain embodiments, hole pairs may be placed such that jets impinge and generate a different pattern (e.g., such that each hole pair would generate two counter-rotating pairs). In certain embodiments, the nozzle cross section may be octagonal or any other suitable polygonal shape to allow each hole pair to be placed on a flat surface of the mixer 105 (e.g., as best shown in FIG. 2E). Any suitable shape for the nozzle and/or any suitable placement of the hole pairs for producing a desired vorticity and/or mixing is contemplated herein.

In accordance with at least one aspect of this disclosure, a nozzle body 107 for a fire suppression nozzle (e.g., 100, 200, 400, 500) can include a first fluid channel 101 configured to be connected to a first fluid source for fire suppression (e.g., an inert gas source), and a mixer (105, 405, 505) as described hereinabove. Any suitable shape for the nozzle body 107 (e.g., tubular such as cylindrical) and/or the mixer 105 is contemplated herein.

Embodiments can be made in any suitable manner (e.g., machining, additive manufacturing) and of any suitable material configured to allow the device to be used as a fire suppression nozzle (e.g., for data center fire suppression). Any mixing of a first fluid and a second fluid for fire suppression to reduce noise using vorticity and/or lobe mixing is contemplated herein. Any added components are contemplated herein (e.g., an attachable diffuser that is used with fire suppression systems as appreciated by those having ordinary skill in the art).

As appreciated by those having ordinary skill in the art, lobe mixing can bring an inner flow and an outer flow together (e.g., such as bypass air and hot high speed core flow of a turbomachine) at different angles to reduce flow speed of a faster flow. Embodiments of this disclosure utilize lobe mixing and/or vorticity for reducing the noise of fire suppression nozzles in operation (e.g., for data centers that are noise sensitive).

Traditional solutions reduced flow speed and area coverage with reduction of noise. However, mixing as disclosed herein above allows reduction of noise with low loss of performance, and in some cases increased performance.

Low-loss and rapid mixing can help to achieve a high-efficiency, compact fluid ejector. The greater the mixing with low-loss, the greater the entrained secondary fluid will be and the greater noise reduction. In addition, the net thrust of the jet of fluid from the ejector can be increased thereby not compromising and possibly even improving the area coverage of the fire suppression.

Although there has been use of lobe mixers in turbomachines to reduce noise, there has been long felt need in sprinklers for noise suppression. The concept of a fluid ejector using streamwise vorticity (induced by a lobed mixer) to reduce the jet noise has been successfully applied to turbomachine engine exhaust systems. Use of this phenomenon, let alone structure capable of inducing such mixing, does not exist for fire-suppression systems.

Any suitable combination(s) of any disclosed embodiments and/or any suitable portion(s) thereof is contemplated therein as appreciated by those having ordinary skill in the art.

The embodiments of the present disclosure, as described above and shown in the drawings, provide for fire suppression nozzles and components thereof with superior properties. While the subject disclosure includes reference to certain embodiments, those skilled in the art will readily appreciate that changes and/or modifications may be made thereto without departing from the spirit and scope of the subject disclosure.

What is claimed is:

1. A fire suppression nozzle, comprising:

a first fluid channel configured to be in fluid communication with a first fluid having a first flow velocity;

a second fluid channel configured to be in fluid communication with a second fluid having a second flow velocity; and a mixer disposed between the first fluid channel and the second fluid channel such that the mixer is configured to induce streamwise vorticity in at least the first fluid exiting first fluid channel to cause mixing of the first fluid and the second fluid to reduce a flow speed of a mixture of the first fluid and the second fluid, wherein the first fluid channel is defined by a nozzle body, wherein the mixer is defined by the nozzle body or attached to the nozzle body, wherein the second fluid channel is defined at least partially by an upper shroud disposed around the nozzle body, the second fluid channel defined at least partially between the upper shroud and the nozzle body, wherein the second fluid channel is defined at least partially by a lower shroud attached to or integral with the nozzle body and/or the mixer downstream of the mixer, wherein the lower shroud and the upper shroud define an outlet of the second fluid channel therebetween where mixed first and second fluid effuse to the atmosphere, wherein the mixer is defined by a lobe mixing shape to cause both the first fluid and the second fluid to rotate together, wherein the mixer is vertically oriented such that the first fluid effuses toward the lower shroud and lobe mixes with the second fluid as it exits the first fluid channel.

2. The nozzle of claim 1, wherein the upper shroud is attached to the nozzle body by one or more ribs.

3. The nozzle of claim 2, wherein the second fluid is air and the upper shroud is open to the atmosphere to allow air to be drawn in by the flow entrainment effect from the first fluid effusing from the first fluid channel to mix air with the first fluid.

4. The nozzle of claim 1, wherein the outlet can include a constant flow area or an expanding flow area.

5. A fire suppression nozzle, comprising:

a first fluid channel configured to be in fluid communication with a first fluid having a first flow velocity;

a second fluid channel configured to be in fluid communication with a second fluid having a second flow velocity; and a mixer disposed between the first fluid channel and the second fluid channel such that the mixer is configured to induce streamwise vorticity in at least the first fluid exiting the first fluid channel to cause mixing of the first fluid and the second fluid to reduce a flow speed of a mixture of the first fluid and the second fluid, wherein streamwise vorticity includes rotational flow, wherein the first fluid channel is defined by a nozzle body, wherein the mixer is defined by the nozzle body or attached to the nozzle body, wherein the second fluid channel is defined at least partially by an upper shroud disposed around the nozzle body, the second fluid channel defined at least partially between the upper shroud and the nozzle body, wherein the upper shroud is attached to the nozzle body by one or more ribs, wherein the second fluid is air and the upper shroud is open to the atmosphere to allow air to be drawn in by the flow entrainment effect from the first fluid effusing from the first fluid channel to mix air with the first fluid.

6. The nozzle of claim 5, the mixer includes angled holes configured to effuse the first fluid from the first fluid channel into the second fluid channel.

7. The nozzle of claim 6, wherein the angled holes are angled relative to each other to cause vorticity in first fluid as it exits the first fluid channel.

8. The nozzle of claim 5, wherein the second fluid channel is defined at least partially by a lower shroud attached to or integral with the nozzle body and/or the mixer downstream of the mixer.

9. The nozzle of claim 8, wherein the lower shroud and the upper shroud define an outlet of the second fluid channel therebetween where mixed first and second fluid effuse to the atmosphere.

10. The nozzle of claim 9, wherein the outlet can include a constant flow area or an expanding flow area.

* * * * *